United States Patent
Kaneko et al.

(10) Patent No.: US 11,213,790 B2
(45) Date of Patent: Jan. 4, 2022

(54) METHOD FOR PRODUCING DEUTERIUM-DEPLETED WATER AND METHOD FOR PRODUCING DEUTERIUM-ENRICHED WATER

(71) Applicants: SHINSHU UNIVERSITY, Nagano (JP); KOTOBUKI HOLDINGS CO., LTD., Fukuoka (JP)

(72) Inventors: Katsumi Kaneko, Nagano (JP); Toshio Takagi, Kitakyushu (JP); Katsuyuki Murata, Kitakyushu (JP); Yuji Ono, Kitakyushu (JP)

(73) Assignees: SHINSHU UNIVERSITY, Nagano (JP); KOTOBUKI HOLDINGS CO., LTD., Fukuoka (JP)

( * ) Notice: Subject to any disclaimer, the term of this patent is extended or adjusted under 35 U.S.C. 154(b) by 537 days.

(21) Appl. No.: 16/306,041

(22) PCT Filed: Jun. 1, 2017

(86) PCT No.: PCT/JP2017/020390
§ 371 (c)(1),
(2) Date: Nov. 30, 2018

(87) PCT Pub. No.: WO2017/209227
PCT Pub. Date: Dec. 7, 2017

(65) Prior Publication Data
US 2019/0193026 A1    Jun. 27, 2019

(30) Foreign Application Priority Data
Jun. 2, 2016   (JP) .............................. JP2016-110934

(51) Int. Cl.
*B01D 59/26*    (2006.01)
*B01D 53/06*    (2006.01)
(Continued)

(52) U.S. Cl.
CPC ............. *B01D 59/26* (2013.01); *B01D 53/06* (2013.01); *B01J 20/20* (2013.01); *B01J 20/3416* (2013.01);
(Continued)

(58) Field of Classification Search
CPC ............. B01D 2253/102; B01D 59/26; B01D 2257/80; B01D 2253/108; B01D 53/047;
(Continued)

(56) References Cited

U.S. PATENT DOCUMENTS
2007/0293707 A1    12/2007   Wolfert et al.

FOREIGN PATENT DOCUMENTS
CA    2959084       3/2016
CN    1456718 A    11/2003
(Continued)

OTHER PUBLICATIONS

International Preliminary Report on Patentability issued in International Patent Application No. PCT/JP2017/020390, dated Nov. 6, 2018, 9 pgs.
(Continued)

*Primary Examiner* — Sharon Pregler
(74) *Attorney, Agent, or Firm* — Haynes and Boone, LLP

(57) ABSTRACT

Water is separated into deuterium-depleted water having a low deuterium concentration and deuterium-enriched water having a high deuterium concentration easily and at low cost.
A method for separating water into deuterium-depleted water and deuterium-enriched water, the method including: adsorbing water vapor on an adsorbent including a pore body having pores 6 while supplying water vapor to and allowing the water vapor to pass through the adsorbent for a predetermined period of time; recovering deuterium-enriched water containing a large amount of heavy water 8
(Continued)

from the water vapor not adsorbed on the adsorbent; and then recovering deuterium-depleted water containing a large amount of light water 7 from the water vapor adsorbed on the adsorbent.

4 Claims, 9 Drawing Sheets

(51) Int. Cl.
    *C01B 5/00*     (2006.01)
    *C01B 5/02*     (2006.01)
    *B01J 20/20*     (2006.01)
    *B01J 20/34*     (2006.01)

(52) U.S. Cl.
    CPC ............. *B01J 20/3483* (2013.01); *C01B 5/00* (2013.01); *C01B 5/02* (2013.01); *B01D 2253/102* (2013.01); *B01D 2253/306* (2013.01); *B01D 2253/308* (2013.01); *B01D 2257/80* (2013.01); *C01P 2006/88* (2013.01)

(58) Field of Classification Search
    CPC .. B01D 53/06; B01D 53/0476; B01D 53/261; B01D 53/28; B01D 59/28; B01D 59/30; B01D 59/50; B01J 20/20; B01J 20/16; B01J 20/28095; B01J 20/3408; B01J 20/3416; B01J 20/3458; B01J 20/3483; C01B 5/00; C01B 5/02; C01B 4/00
    See application file for complete search history.

(56) References Cited

FOREIGN PATENT DOCUMENTS

| | | |
|---|---|---|
| CN | 101224929 A | 7/2008 |
| CN | 102207314 A | 10/2011 |
| CN | 107530627 A | 1/2018 |
| EP | 3278864 | 2/2018 |
| JP | S53110800 A | 9/1978 |
| JP | 2007-093536 | 4/2007 |
| JP | 2008-512338 | 4/2008 |
| JP | 2012-158499 | 8/2012 |
| TW | 2016-15558 A | 5/2016 |
| WO | WO 2015/072981 A1 | 5/2015 |
| WO | WO 2016/031896 | 3/2016 |
| WO | WO 2016/158549 | 10/2016 |

OTHER PUBLICATIONS

Supplementary European Search Report issued in European Patent Application No. 17806777, dated Jan. 13, 2020, 11 pgs.
Zhang et al., "Preparation and Application of Deuterium Depleted Water," Dec. 25, 2009, vol. 50, No. 12, Shanghai Research Institute of Chemical Industry, Shanghai 200062, China.
Delajon et al., "Absorption of light and heavy water vapours in polyelectrolyte multilayer films," Dec. 31, 2009, pp. 462-467, vol. 74, No. 2, Colloids and Surfaces B: Biointerfaces, Elsevier B.V., doi:10.1016/j.colsurfb.2009.08.051.
Office Action for corresponding TW Patent Application No. 106113444, dated Jun. 29, 2020; 7 pages.

Fig.4
(a)
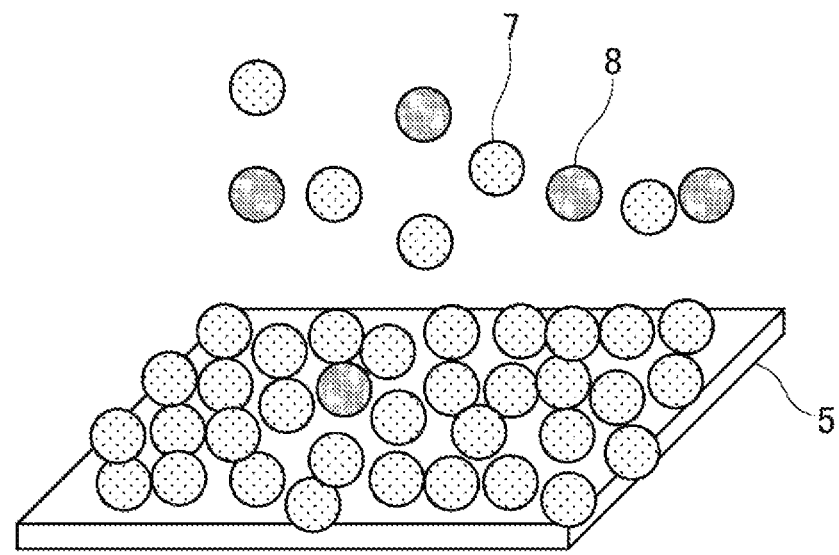
(b)
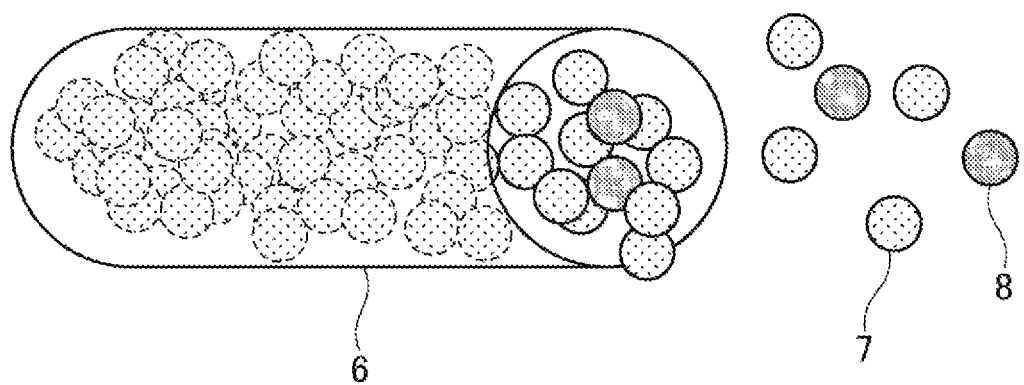

Fig.6
(a)
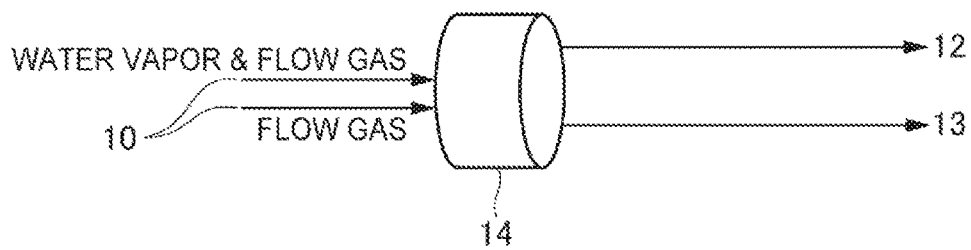
(b)
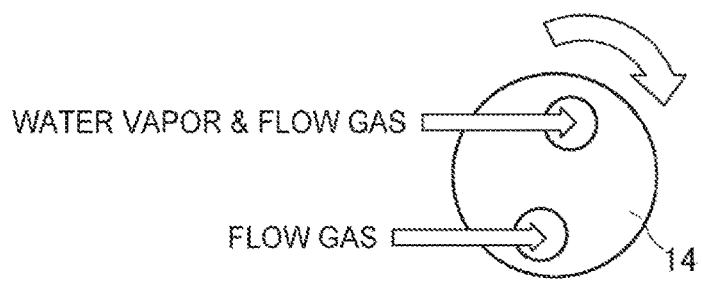
(c)
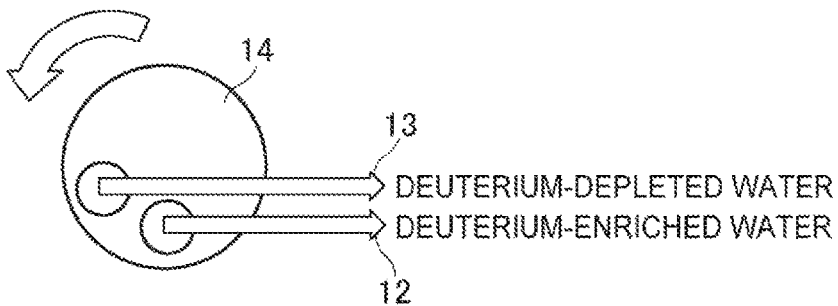
(d)
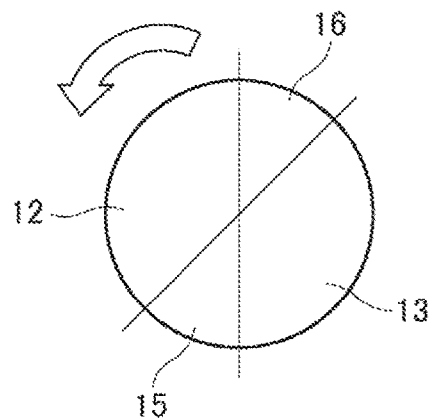

Fig.7
(a)
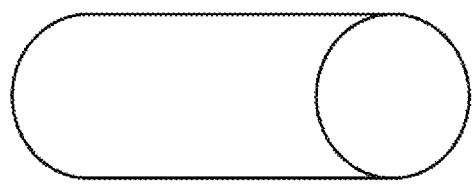
(b)
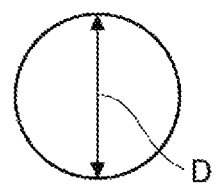
(c)
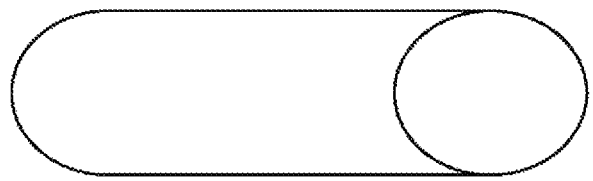
(d)
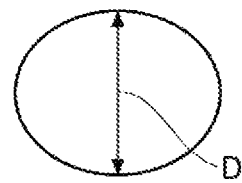
(e)
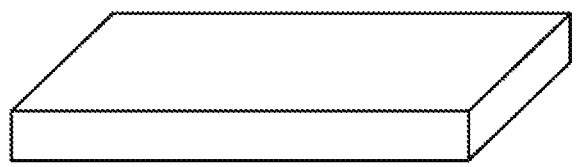
(f)
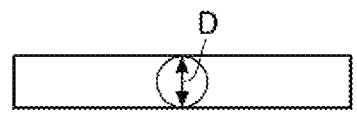

Fig.8
(a)
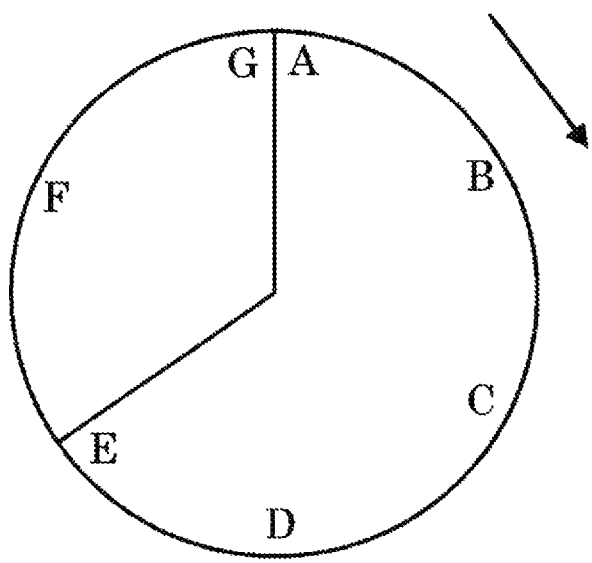
(b)
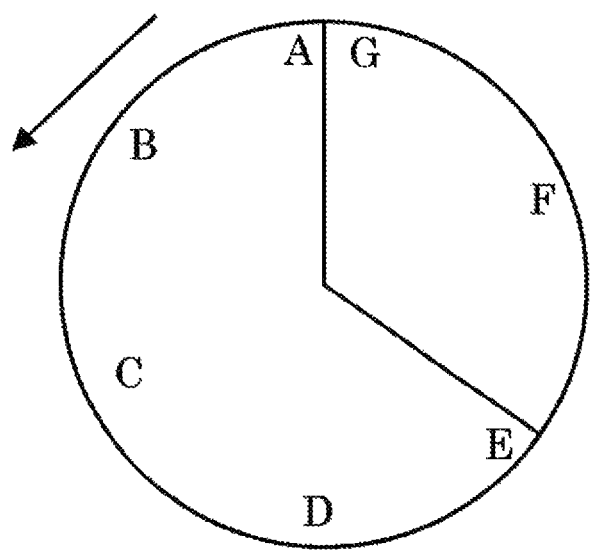

Fig. 9

| POSITION | A | B | C | D | E | F |
|---|---|---|---|---|---|---|
| TIME DURING WHICH WATER VAPOR FLOWED (min.) | 0 | 30 | 60 | 90 | 120 | 120 |
| HUMIDITY (%) | 0 | 0 | 50 | 90 | 90 | 90 |
| DEUTERIUM CONCENTRATION (ppm) | - | - | 155 | 165 | 160 | 125 |

METHOD FOR PRODUCING DEUTERIUM-DEPLETED WATER AND METHOD FOR PRODUCING DEUTERIUM-ENRICHED WATER

CROSS REFERENCE

This application is a United States national phase application of international patent application number PCT/JP2017/020390, filed Jun. 1, 2017, which claims priority to Japanese patent application number 2016-110934, filed Jun. 2, 2016, the entire disclosures of which are hereby incorporated herein by reference.

TECHNICAL FIELD

The present invention relates to a method for producing deuterium-depleted water having a decreased amount of heavy water or semi-heavy water from regular water.

The present invention also relates to a method for producing deuterium-enriched water containing a large amount of heavy water or semi-heavy water from regular water.

BACKGROUND ART

In regular water, $H_2O$ (light water) is mixed with $D_2O$ (heavy water) and DHO (semi-heavy water), which are water molecules containing a deuterium atom of an isotope of hydrogen atom. The concentration of heavy water and semi-heavy water contained in water in nature differs depending on the place to be sampled, but it is about 150 ppm in the flat land, and most of these is semi-heavy water.

The amount of heavy water and semi-heavy water contained in the human body is as minute as 95 ppm of the body weight for an adult having a body weight of 60 kg, for example.

However, heavy water and semi-heavy water are different from light water in physical properties such as solubility of a substance, electric conductivity, and ionization degree and the reaction rate and thus cause disorder in vivo reactions when being ingested in a large amount of heavy water and semi-heavy water, and a living thing dies in pure heavy water. For this reason, it is said that it is more desirable for human health as the deuterium concentration in drinking water and the like is lower, and the verification has proceeded.

Deuterium-depleted water, which hardly contains heavy water and semi-heavy water, is approved as an anticancer drug for animals in Hungary and is often drunk by cancer patients and the like although deuterium-depleted water is not approved by Ministry of Health, Labour and Welfare in Japan.

As a method for producing deuterium-depleted water from regular water, deuterium-depleted water has been produced by a method in which distillation is repeated by utilizing a significantly small difference in physical properties between hydrogen and deuterium (Patent Literature 1) and a method by water electrolysis (Patent Literature 2) in the conventional technique.

However, in the conventional method for producing deuterium-depleted water, a large-scale facility and repetition of complicated operations are required and the manufacturing cost is high. For this reason, it has been a great economic liability for cancer patients and those who want to drink deuterium-depleted water in anticipation of various efficacies.

In addition, heavy water can be used in the radiation therapy of cancer and the like as a moderator of radiation. In addition to this, it is expected to enhance the effect of anticancer drugs by substituting the anticancer drugs with deuterium using heavy water and semi-heavy water as a raw material.

For this reason, a method capable of efficiently separating light water from heavy water and semi-heavy water has been required.

CITATION LIST

Patent Literature

Patent Literature 1: Japanese Unexamined Patent Publication No. 2008-512338

Patent Literature 2: Japanese Unexamined Patent Publication No. 2012-158499

SUMMARY OF INVENTION

Technical Problem

The present invention has been made to solve the above problems, and an object thereof is to separate water into deuterium-depleted water and deuterium-enriched water easily and at low cost.

Solution to Problem

In the present invention, the means for solving the above problems is as follows.

A first invention is a method for producing deuterium-depleted water by removing heavy water and semi-heavy water from water, the method including: adsorbing water vapor on an adsorbent including a pore body while supplying water vapor to and allowing the water vapor to pass through the adsorbent for a predetermined period of time; and then desorbing the water vapor adsorbed on the adsorbent and recovering from the adsorbent.

A second invention is a method for producing deuterium-depleted water by removing heavy water and semi-heavy water from water, the method including: rotating an adsorbent including a pore body in a circumferential direction, and disposing a supply port for water vapor and a supply port for a flow gas not containing water vapor side by side in the circumferential direction of rotation of the adsorbent, supplying the water vapor to and allowing the water vapor to pass through a part of the adsorbent; recovering deuterium-enriched water from the water vapor not adsorbed on and passed through the adsorbent; and at the same time, supplying the flow gas to and allowing the flow gas to pass through another part of the adsorbent; and desorbing the water vapor adsorbed on the adsorbent from the adsorbent.

A third invention is a method for producing deuterium-enriched water by removing light water from water, the method comprising: adsorbing water vapor on an adsorbent including a pore body while supplying water vapor to and allowing the water vapor to pass through the adsorbent for a predetermined period of time; and recovering the water vapor not adsorbed on and passed through the adsorbent.

A fourth invention is a method for producing deuterium-enriched water by removing light water from water, the method comprising: rotating an adsorbent including a pore body in a circumferential direction, and disposing a supply port for water vapor and a supply port for a flow gas not containing water vapor side by side in the circumferential direction of rotation of the adsorbent; supplying water vapor to and allowing the water vapor to pass through a part of the adsorbent; and at the same time, supplying the flow gas to and allowing the flow gas to pass through another part of the adsorbent; and desorbing the water vapor adsorbed on the adsorbent and recovering from the adsorbent.

Advantageous Effects of Invention

According to the first invention, it is possible to easily and efficiently obtain deuterium-depleted water by adsorbing water vapor on an adsorbent including a pore body while supplying the water vapor to and allowing the water vapor to pass through the adsorbent for a predetermined period of time and then desorbing and recovering the water vapor adsorbed on the adsorbent therefrom.

According to the second invention, it is possible to repeat adsorption and desorption of water vapor without interruption and to efficiently produce deuterium-depleted water by rotating an adsorbent including a pore body in a circumferential direction, also disposing a supply port for water vapor and a supply port for a flow gas not containing water vapor side by side in the circumferential direction of rotation of the adsorbent, supplying the water vapor to and allowing the water vapor to pass through a part of the adsorbent, recovering deuterium-enriched water from the water vapor not adsorbed on and passed through the adsorbent, and at the same time, supplying the flow gas to and allowing the flow gas to pass through another part of the adsorbent, and desorbing the water vapor adsorbed on the adsorbent therefrom.

According to the third invention, it is possible to easily and efficiently obtain deuterium-enriched water by a method for producing deuterium-enriched water by removing light water from water, the method comprising: adsorbing water vapor on an adsorbent including a pore body while supplying water vapor to and allowing the water to pass through the adsorbent for a predetermined period of time, and recovering the water vapor not adsorbed on and passed through the adsorbent.

According to the fourth invention, it is possible to repeat adsorption and desorption of water vapor without interruption and to efficiently produce the deuterium-enriched water by a method for producing deuterium-enriched water by removing light water from water, the method comprising: rotating an adsorbent including a pore body in a circumferential direction and disposing a supply port for water vapor and a supply port for a flow gas not containing water vapor side by side in the circumferential direction of rotation of the adsorbent; supplying water vapor to and allowing the water vapor to pass through a part of the adsorbent; and at the same time, supplying the flow gas to and allowed the flow gas to pass through another part of the adsorbent, and desorbing the water vapor adsorbed on the adsorbent and recovering from the adsorbent.

BRIEF DESCRIPTION OF DRAWINGS

FIG. 4(a) is a schematic diagram illustrating adsorption of water vapor on a flat adsorbent and FIG. 4(b) is a schematic diagram illustrating adsorption of water vapor on an adsorbent including a pore body.

FIG. 6 is an explanatory diagram illustrating a separator according to a second embodiment of the present invention, FIG. 6(a) is a whole view, FIG. 6(b) is a diagram as seen from the inlet of the adsorbent, FIG. 6(c) is a diagram as seen from the outlet of the adsorbent, and FIG. 6(d) is also a diagram as seen from the outlet of the adsorbent.

FIG. 7(a) is an explanatory diagram illustrating a pore having a new circular cross section, FIG. 7(b) is a cross-sectional diagram of the same pore, FIG. 7(c) is an explanatory diagram illustrating a pore having an elliptical cross section, FIG. 7(d) is a cross-sectional diagram of the same pore, FIG. 7(e) is an explanatory diagram illustrating a slit-shaped pore, and FIG. 7(f) is a cross-sectional diagram of the same pore.

FIG. 8 is an explanatory diagram illustrating the test of the present invention, FIG. 8(a) is a diagram as seen from the inlet side of water vapor and FIG. 8(b) is a diagram as seen from the outlet side of water vapor.

FIG. 9 is a table illustrating the deuterium concentration at every position obtained in the same test.

DESCRIPTION OF EMBODIMENTS

Hereinafter, a method for producing deuterium-depleted water according to an embodiment of the present invention will be described.

The present invention utilizes the fact that an initial adsorption rate of light water on a predetermined adsorbent is higher than the initial adsorption rates of heavy water and semi-heavy water.

In addition, the present invention utilizes the fact that diffusion impairment occurs at the time of adsorption of water molecules and saturation of adsorption in an adsorption agent including a pore body.

Figure 1:
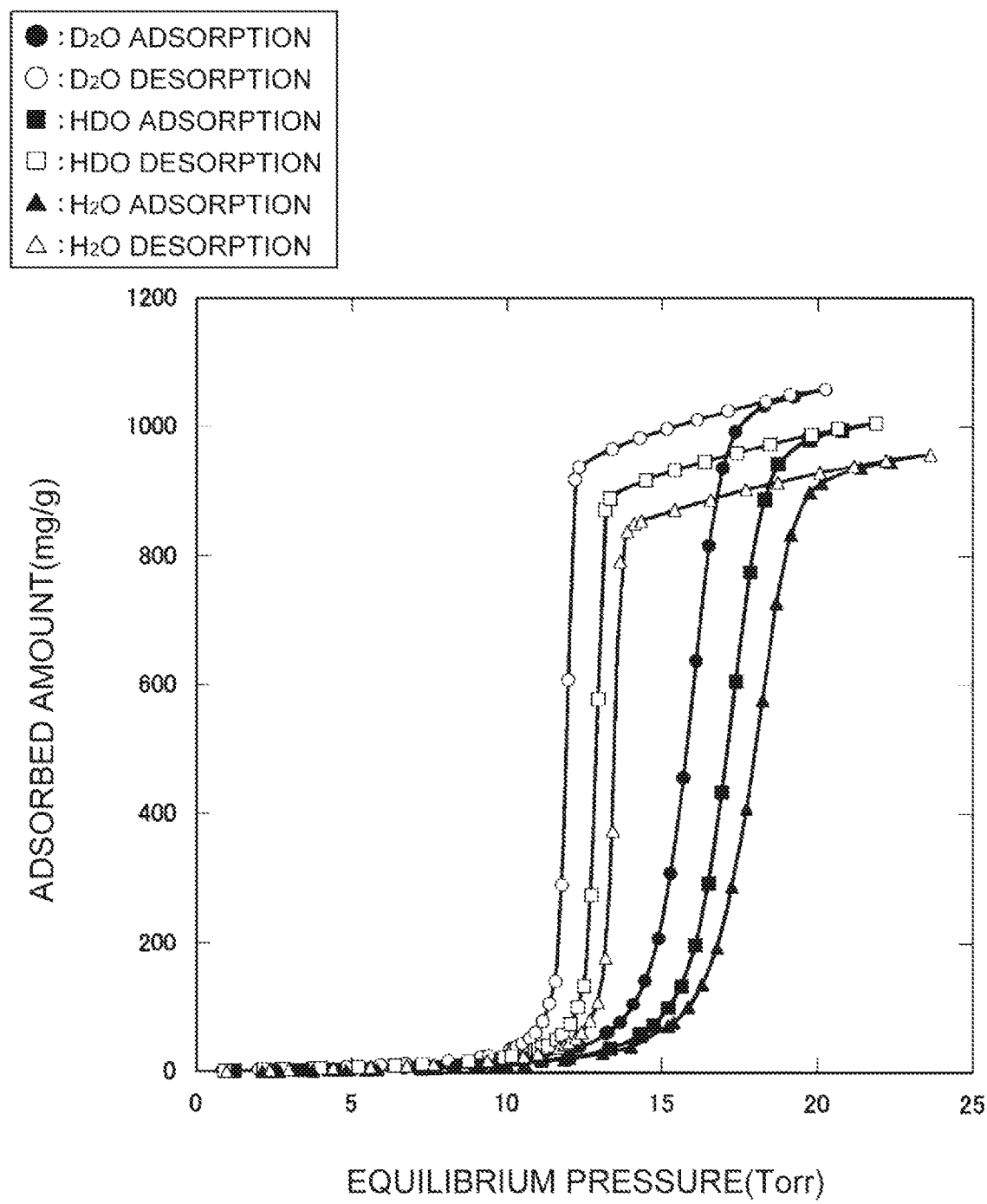
FIG. 1 is water vapor adsorption isotherms of heavy water, semi-heavy water, and light water on activated carbon at 25° C.

FIG. 1 is a graph showing the water vapor adsorption isotherms of heavy water, semi-heavy water, and light water at 25° C. in a divided manner in a case in which the adsorbent is activated carbon (ACTIVATED CARBON FIBER "A-20" manufactured by AD'ALL Co., LTD.).

As illustrated in FIG. 1, the amounts of all of heavy water, semi-heavy water, and light water adsorbed on the activated carbon greatly change by a small change in pressure. In addition, all of heavy water, semi-heavy water and light water exhibit hysteresis at the time of adsorption on and desorption from the activated carbon.

When water vapor pressure is raised from a low pressure and water vapor is adsorbed on activated carbon, a large amount of heavy water is adsorbed on the activated carbon at from 14 to 17 Torr, a large amount of semi-heavy water is adsorbed on the activated carbon at from 15 to 18 Torr, and a large amount of light water is adsorbed on the activated carbon at from 16 to 19 Torr.

In addition, when water vapor is sufficiently adsorbed on activated carbon, then water vapor pressure is lowered from a high pressure and water vapor is desorbed from the activated carbon, a large amount of light water is desorbed from the activated carbon at from 14 to 13 Torr, a large amount of semi-heavy water is desorbed from the activated carbon at from 13 to 12 Torr, and a large amount of heavy water is desorbed from the activated carbon at from 12 to 11 Torr.

<Measurement of Adsorption Rate and Desorption Rate>

Figure 2:
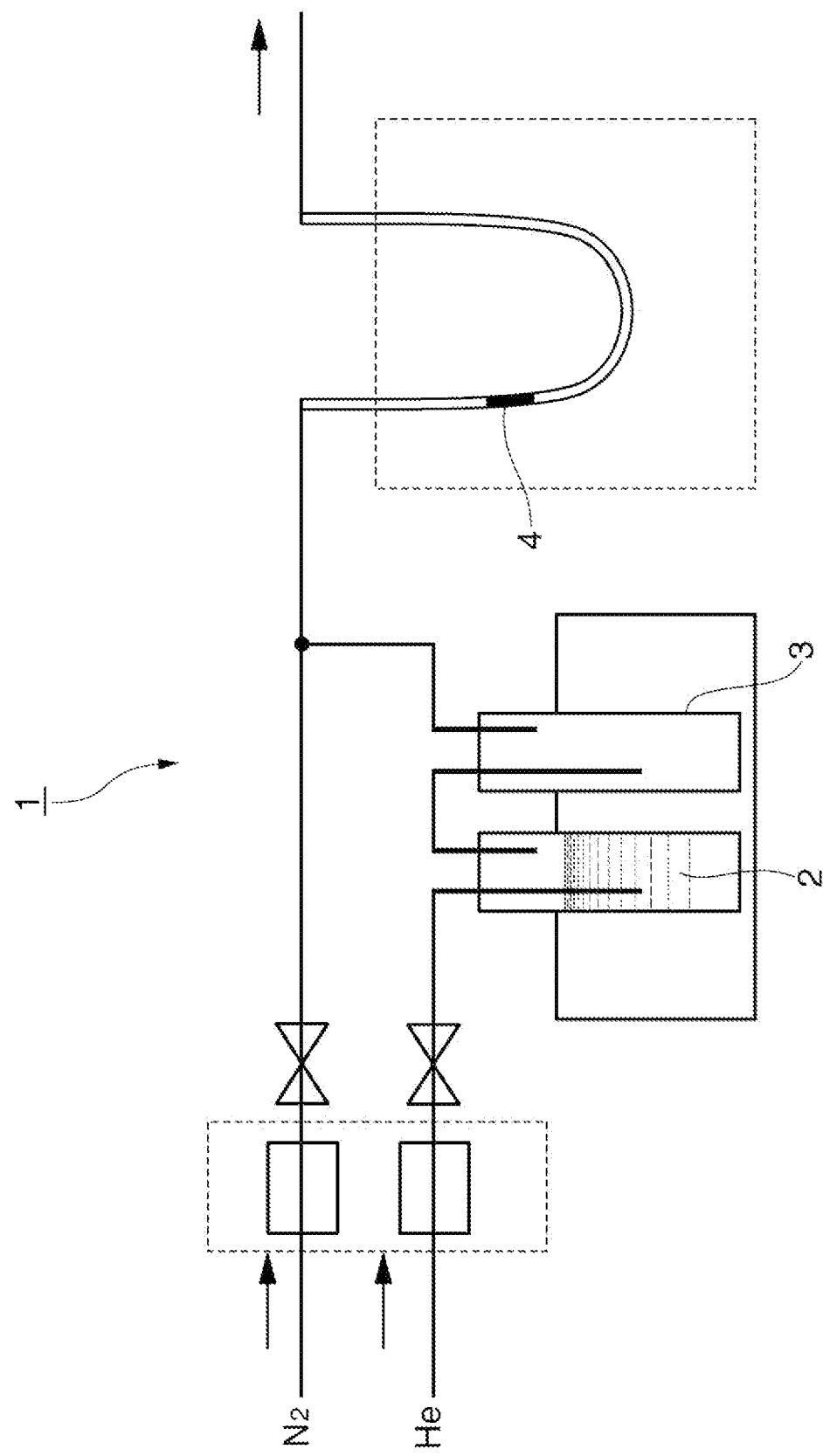
FIG. 2 is a diagram illustrating a measuring apparatus for measuring the adsorption rates and desorption rates of light water and heavy water from an adsorbent.

The adsorption rates and desorption rates of light water, heavy water and semi-heavy water from the adsorbent are measured by using a measuring apparatus illustrated in FIG. 2.

In this measuring apparatus 1, helium gas is used as a carrier of water vapor. Incidentally, helium gas is used in the present embodiment, but the kind of carrier is not limited as long as it is a gas which can be used as a carrier of water vapor.

First, helium gas is released into water 2 and the gas which has floated up is recovered. Subsequently, an empty test tube 3 is allowed to pass through this helium gas to drop excess water droplets and the gas is recovered again.

By this, helium gas containing water vapor can be obtained.

It is possible to control the humidity (relative pressure of water vapor) of the mixed gas by mixing dry nitrogen gas to be supplied from another system with this helium gas.

The adsorption rates and desorption rates of light water and heavy water from the adsorbent are measured by allowing this mixed gas to pass through a tube in which 35.5 mg of an adsorbent 4 is disposed to change the humidity of the mixed gas. The supply rate of the mixed gas is set so that the sum of the helium gas containing water vapor and the dry nitrogen gas is 50 ml/min. In addition, the entire measuring apparatus 1 is kept at 15° C.

Hereinafter, description will be made based on an example in which activated carbon (ACTIVATED CARBON FIBER "A-20" manufactured by AD'ALL Co., LTD.) is used as an adsorbent.

First, in order to measure the adsorption rate, the mixing proportion of the mixed gas is adjusted and a mixed gas having a humidity of 40% is supplied to the adsorbent 4 for a certain time. Subsequently, a mixed gas having a humidity of 90% is supplied to the adsorbent 4, the adsorption rate of each of light water and heavy water is measured from the changes in the amounts of light water and heavy water in the mixed gas recovered from the lower courses of the adsorbent.

Figure 3:
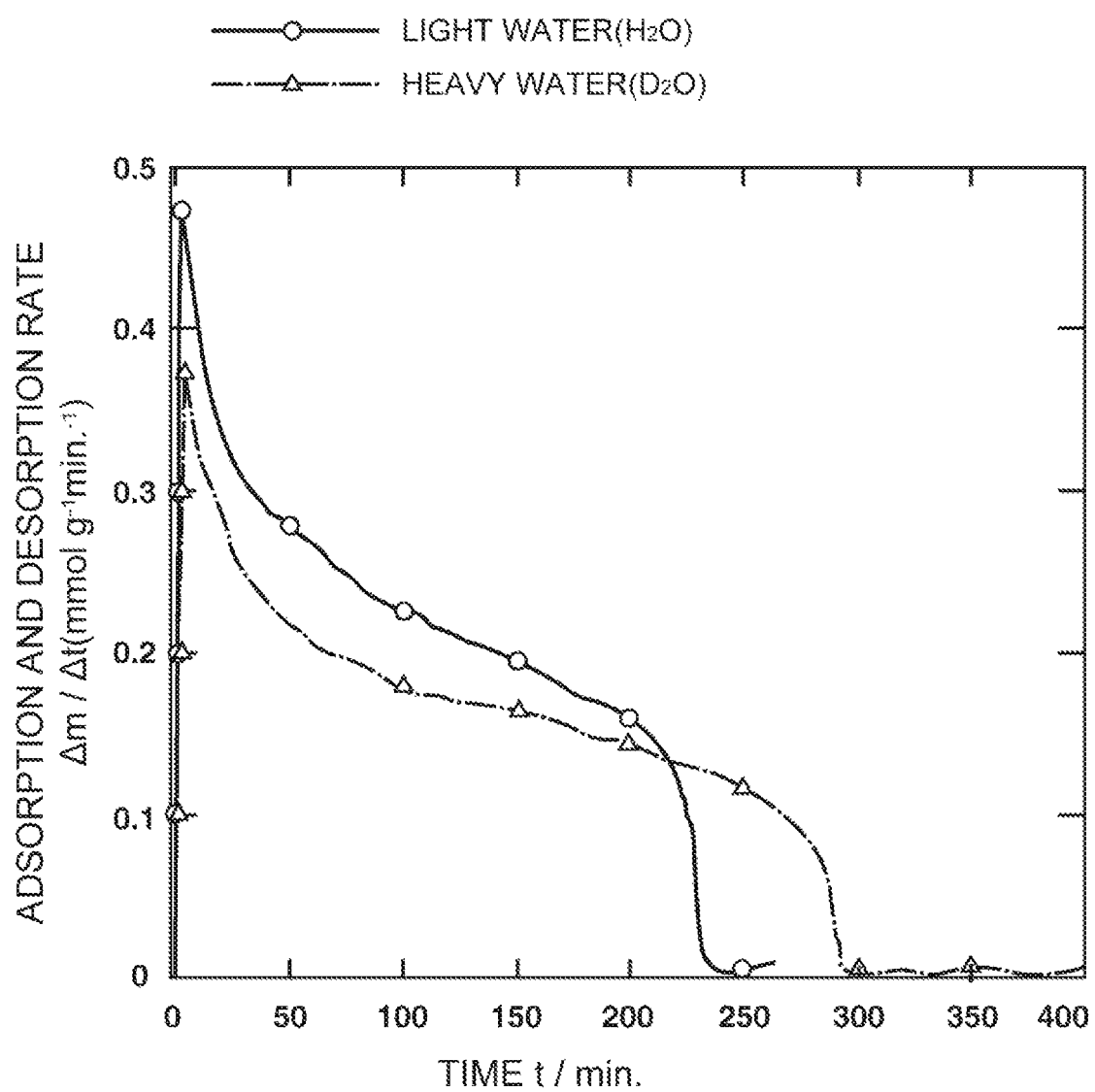
FIG. 3 is a graph showing the adsorption rates of light water and heavy water on an adsorbent.

The graph of FIG. 3 shows the results.

As illustrated in FIG. 3, the adsorption rate of light water is significantly fast and greatly exceeds the adsorption rate of heavy water during the time from the start of supply of the mixed gas having a humidity of 90% (0 minute) to about 10th minute.

The adsorption rate of light water is moderate and exceeds the adsorption rate of heavy water during the time from 40th minute to 220th minute.

The adsorption rate of light water sharply decreases and falls below the adsorption rate of heavy water after 220th minute.

Light water reaches the equilibrium state in approximately 230 minutes and heavy water reaches the equilibrium state in approximately 290 minutes.

Incidentally, it is considered that the adsorption rate of semi-heavy water is the average value of those of light water and heavy water.

The present invention utilizes the fact that the initial adsorption rate of light water on the adsorbent greatly exceeds the initial adsorption rates of heavy water and semi-heavy water and uses an adsorbent including a pore body.

Here, a pore body means a material having a great number of pores on the surface. In addition, pores mean those having an aspect ratio greater than 5, that is, those having a length to the bottom longer than the pore diameter D of the opening portion by 5 times or more. The pore diameter D means the diameter of the cross section in the case of pores having a tubular shape close to the new circle as typified by zeolite as illustrated in FIGS. 7(a) and 7(b), and the pore diameter D means a short diameter in a case in which the cross section is elliptical as illustrated in FIGS. 7(c) and 7(d). In addition, the pore diameter D means the diameter of the largest circle which enters the cross section in the case of slit-shaped pores as typified by activated carbon as illustrated in FIGS. 7(e) and 7(f).

In addition, with regard to the surface of the adsorbent, the surface area of a relatively flat portion which is not a pore is called an outer surface area, and one in which the ratio of this outer surface area to the inner surface area of the pore is greater than 1:10 is called a pore body in the case of carbon materials typified by activated carbon, and one in which the ratio is greater than 1:5 is called a pore body in the case of oxides typified by silica and zeolite.

In addition, it is required that there is a rise in the adsorption isotherm and water vapor is rapidly adsorbed when being supplied at a predetermined pressure or more. It is preferable to use materials classified as type I, type II, type IV or type V in the classification of adsorption isotherms by IUPAC.

In addition, it is preferable that the pore body is a material hardly exhibiting irreversible adsorption that adsorbed water vapor cannot be easily desorbed from the material.

Examples of such an adsorbent may include an activated carbon fiber (ACTIVATED CARBON FIBER: A20, manufactured by AD'ALL Co., LTD.), silica gel (FUJI SILICA GEL TYPE B, manufactured by FUJI SILYSIA CHEMICAL LTD.), and aluminophosphate-based zeolite (ALPO-5, manufactured by Tosoh Corporation)

When regular water vapor is supplied to an adsorbent 5 having a flat surface, light water 7 is quickly adsorbed on the adsorbent 5 and saturated and heavy water and semi-heavy water 8 are slowly adsorbed on the adsorbent 5 and saturated as illustrated in FIG. 4(a).

Thereafter, an equilibrium state is obtained as the exchange of molecules occurs between the water vapor adsorbed on the adsorbent and the water vapor in the air.

On the contrary, when regular water vapor is supplied to the adsorbent including a pore body, the light water 7 having a high initial adsorption rate first enters pores 6 and is adsorbed on the inner surface of the pores 6 as illustrated in FIG. 4(b).

Subsequently, the light water 7 is saturated and then the heavy water and semi-heavy water 8 are also saturated. At the steady state, the exchange of molecules occurs only in the vicinity of inlet of the pores 6, the entry of external molecules is hindered by the molecules of the light water 7 filled in the pores 6 because of the elongated shape of the interior of the pores 6, diffusion impairment occurs and the exchange of molecules hardly occurs. Hence, in the interior of the pores, the light water concentration is kept higher than in the original equilibrium state.

For this reason, in the adsorbent including a pore body, most of the water vapor adsorbed on the inner surface of the pores 6 is light water 7 and heavy water and semi-heavy water 8 are hardly contained in the water vapor.

First Embodiment

Figure 5:
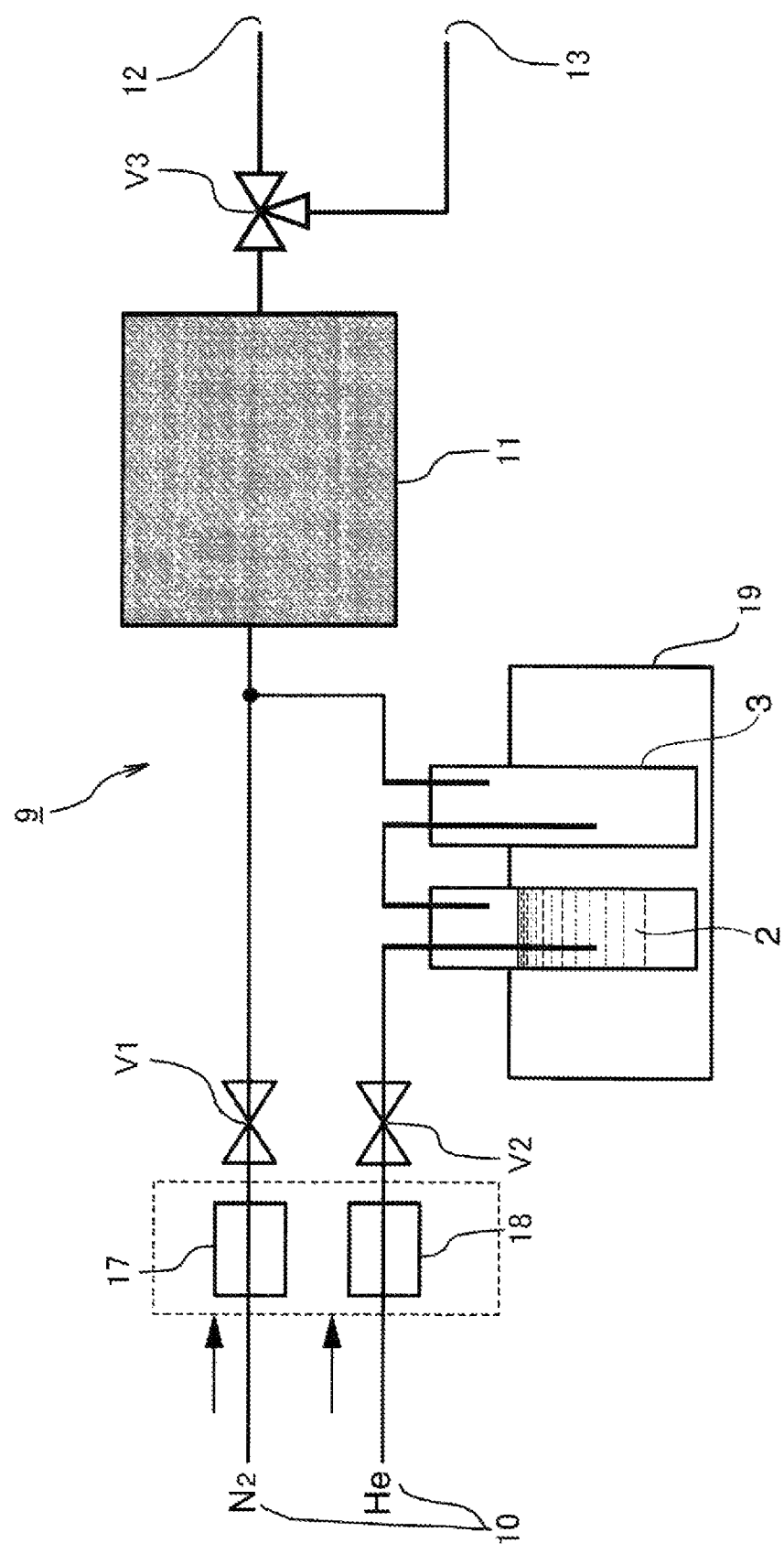
FIG. 5 is an explanatory diagram illustrating a separator according to a first embodiment of the present invention.

As illustrated in FIG. 5, a separator 9 of the first embodiment includes a supply apparatus 10 capable of separately supplying a flow gas (nitrogen gas, helium gas), a water vapor generator 19 for allowing helium gas to pass through the water 2 and empty test tube 3 and supplying water vapor to the helium gas, an adsorption tank 11 containing an adsorbent which includes a pore body and disposed so that water vapor or a flow gas passes therethrough, a deuterium-enriched water outlet 12, a deuterium-depleted water outlet 13, mass flow controllers 17 and 18 provided to each of a pipe for nitrogen gas and a pipe for helium gas, and valves V1, V2, and V3.

In the first embodiment, first, when the valve V1 and the valve V2 are opened, the valve V3 is operated to open the deuterium-enriched water outlet 12, and water vapor and a flow gas are supplied from the supply apparatus 10 to the adsorption tank 11 at a flow rate of 50 mL/min by using the mass flow controllers 17 and 18, light water is quickly adsorbed on the adsorbent and the deuterium concentration (concentrations of heavy water and semi-heavy water) in the water vapor which has passed through the adsorbent increases. Hence, it is possible to recover deuterium-enriched water containing a large amount of deuterium via the deuterium-enriched water outlet 12.

Subsequently, when the valve V2 is closed, the valve V3 is operated to open the deuterium-depleted water outlet 13, and a flow gas (nitrogen gas) is supplied from the supply apparatus 10 to the adsorption tank 11, the water vapor which has been adsorbed on the adsorbent and has a low deuterium concentration is desorbed therefrom and carried by the flow gas. Hence, it is possible to recover deuterium-depleted water which hardly contains deuterium via the deuterium-depleted water outlet 13.

In this manner, the step of supplying and adsorbing water vapor on the adsorbent and the step of supplying a flow gas and desorbing water vapor are alternately repeated.

The deuterium concentration in regular water vapor to be supplied to the adsorption tank 11 is 150 ppm, but in the first embodiment, it was possible to recover deuterium-enriched water having a deuterium concentration of 160 ppm and deuterium-depleted water having a deuterium concentration of 130 ppm.

According to the first embodiment, it is possible to easily separate deuterium-depleted water and deuterium-enriched water from each other without using an adsorbent exhibiting adsorption hysteresis.

In addition, the temperature increases when water vapor is adsorbed on the adsorbent, and the water vapor is likely to be desorbed when the flow gas is supplied thereafter. Furthermore, the temperature decreases when water vapor is desorbed from the adsorbent, and the water vapor is likely to be adsorbed when water vapor is supplied thereafter.

It is possible to efficiently and continuously obtain deuterium-enriched water and deuterium-depleted water by alternately repeating the step of adsorbing water vapor on the adsorbent and the step of desorbing water vapor from the adsorbent in this manner.

Second Embodiment

In the second embodiment, as illustrated in FIG. 6, a rotary type adsorbent 14 is used.

This separator 9 includes a supply apparatus 10 capable of supplying water vapor and a flow gas (nitrogen gas and the like), an adsorbent 14 which includes a pore body and disposed so that water vapor or a flow gas passes therethrough, a deuterium-enriched water outlet 12, and a deuterium-depleted water outlet 13.

The adsorbent 14 is formed in a disc shape or a cylindrical shape and is disposed with the flat surface facing in the upstream direction and the downstream direction.

In addition, the route for supplying water vapor and a flow gas from the supply apparatus 10 to the adsorbent 14 and the route for supplying only a dry flow gas are separated, and both of these are disposed side by side in the circumferential direction of the adsorbent 14. The supply ports for the mixed gas and flow gas are immobile.

In the second embodiment, a mixed gas of water vapor and a flow gas and a flow gas are simultaneously supplied while rotating the adsorbent 14 in the circumferential direction.

The flow rate of the mixed gas is set to 50 ml/min and the humidity is set to 90%.

The rotational speed of the adsorbent 14 is set to 3 rph.

When water vapor is supplied to the adsorbent 14, light water is quickly adsorbed on the adsorbent and the deuterium concentration in the water vapor which has passed through the adsorbent increases. The deuterium-enriched water is recovered by providing the deuterium-enriched water outlet 12 at the position at which this passed water vapor is released.

Thereafter, by the rotation of the adsorbent 14, the water vapor which has been adsorbed on the adsorbent 14 and has a low deuterium concentration is desorbed therefrom and carried by the flow gas as the flow gas is supplied to the portion at which the water vapor is adsorbed.

The deuterium-depleted water is recovered by providing a deuterium-depleted water outlet 13 at the position at which this water vapor is released.

Thereafter as well, by the rotation of the adsorbent 14, the adsorption and desorption of water vapor are repeated at predetermined sites of the adsorbent 14.

In the route for supplying only the flow gas, it is preferable to supply a high-temperature flow gas in order to promote desorption of water vapor from the adsorbent and to alleviate the temperature decrease of the adsorbent due to the heat of vaporization.

However, it is preferable to flow a low-temperature flow gas and thus to cool the adsorbent so that water vapor is likely to be adsorbed in the vicinity of the site at which the route is switched from the route for supplying only the flow gas to the route for supplying the mixed gas containing water vapor along the rotating direction of the adsorbent. In other words, at an arbitrary place of the adsorbent, a mixed gas containing water vapor, a high-temperature flow gas, and a low-temperature flow gas are sequentially and repeatedly supplied in accordance with the rotation.

As illustrated in FIG. 6(d), it is preferable to provide an intermediate zone 15 for discharging water vapor without recovering the water vapor at the place between the deuterium-enriched water outlet 12 and the deuterium-depleted water outlet 13.

In addition, it is preferable to provide an intermediate zone 16 for discharging the flow gas which hardly contains water vapor at the place between the deuterium-depleted water outlet 13 and the deuterium-enriched water outlet 12.

The deuterium concentration in regular water vapor to be supplied to the adsorbent 14 is 150 ppm, but in the second embodiment, it was possible to recover deuterium-enriched water having a deuterium concentration of 160 ppm and deuterium-depleted water having a deuterium concentration of 130 ppm.

In the second embodiment as well, it is possible to easily separate deuterium-depleted water and deuterium-enriched water from each other without using an adsorbent exhibiting adsorption hysteresis. In addition, the temperature increases when water vapor is adsorbed on the adsorbent 14, and the water vapor is likely to be desorbed when the flow gas is supplied thereafter. The temperature decreases when water vapor is desorbed from the adsorbent 14, and the water vapor is likely to be adsorbed when water vapor is supplied thereafter.

It is possible to continuously obtain deuterium-enriched water and deuterium-depleted water by alternately repeating the step of adsorbing water vapor on the adsorbent 14 and the step of desorbing water vapor from the adsorbent 14 in this manner.

Furthermore, it is possible to repeat the adsorption and desorption of water vapor without interruption and to efficiently produce deuterium-enriched water and deuterium-depleted water by simultaneously supplying a mixed gas containing water vapor and a flow gas to separate portions of the rotating adsorbent 14.

It is possible to obtain deuterium-depleted water having a lower deuterium concentration by repeatedly supplying the deuterium-depleted water recovered via the deuterium-depleted water outlet 13 to the same or different adsorbent if necessary.

In addition, it is possible to obtain deuterium-enriched water having a higher deuterium concentration by repeatedly supplying the deuterium-enriched water recovered via the deuterium-enriched water outlet 12 to the same or different adsorbent.

In addition, it is also possible to manufacture a humidifier which includes the separator of the second embodiment illustrated in FIG. 6 in the interior and diffuses and releases the water vapor to be recovered via the deuterium-depleted water outlet 13 as it is.

This humidifier can supply water vapor having a low deuterium concentration.

Incidentally, in this humidifier, the water vapor to be recovered via the deuterium-enriched water outlet 12 is condensed and stored in a predetermined container so as to be discarded or utilized.

<Modification>

In addition, as a modification of the second embodiment, it is also possible to supply liquid water instead of supplying water vapor.

In this case, the supply port for water is disposed at the lower part of the adsorbent 14 and the supply port for dry flow gas is disposed at the upper part of the adsorbent 14. A part of the adsorbent 14 is immersed in water for a predetermined period of time in association with rotation, and then pulled up from the water, and, the liquid water in the gaps of the adsorbent is first removed and water vapor adsorbed on the adsorbent is subsequently desorbed by allowing a dry flow gas to pass through the adsorbent.

Water vapor of light water is quickly adsorbed on the pores of the adsorbent 14 when the adsorbent 14 is immersed in water, and thus the liquid water which is in the gaps of the adsorbent and is not involved in the adsorption is first removed, the water vapor attached to the flat surface of the adsorbent is next desorbed, and the water vapor which is attached to the pores of the adsorbent and has a low deuterium concentration is subsequently desorbed when a dry flow gas passes through the adsorbent.

Hence, the discharge port is formed at the position at which the water and water vapor in the gaps and on the flat surface of the adsorbent are discharged and the deuterium-depleted water outlet 13 is formed at the position at which the water vapor having a low deuterium concentration is discharged.

Incidentally, the deuterium concentration in the water in the gaps and water vapor attached to the outer surface (flat surface) of the adsorbent hardly changes from 150 ppm.

<Test>

In order to measure the effect of the present invention, a test was conducted.

As the adsorbent, ACTIVATED CARBON A20 formed in a cylindrical shape was used.

As illustrated in FIG. 8(*a*), a mixed gas containing water vapor is supplied to the range of 240 degrees on the surface on the inlet side of the adsorbent and a dry flow gas is supplied to the remaining range of 120 degrees. The supply ports for the mixed gas and flow gas are immobile.

The positions on the circumference of the adsorbent are distinguished one from another by denoting signs of A, B, C, D, E, F, and G every approximately 60 degrees. A and G are substantially adjacent. A to G shall not move even when the adsorbent rotates since these are fixed positions.

The adsorbent is rotated in the circumferential direction at a rotational speed of 3 rph.

As illustrated in FIG. 8, the direction of rotation of the adsorbent is set so that a part of the adsorbent circulates in the order of A, B, C, D, E, F, G, and A.

A mixed gas of water vapor and a flow gas having a humidity of 90% is supplied to from A to E, a high-temperature dry flow gas is supplied to F, and a low-temperature dry flow gas is supplied to G.

The water vapor or flow gas which has flowed into the adsorbent in the positions A to G is discharged when approaching exactly the same positions as those into which the water vapor or flow gas has flowed in association with rotation of the adsorbent.

FIG. 9 is a table illustrating the relation between the time elapsed after the test has started and the deuterium concentration at each place.

As in A and B, the entire water vapor supplied was adsorbed on the adsorbent until it elapsed about 40 minutes after the water vapor was started to flow into the dry adsorbent, and thus the humidity of the gas discharged via the outlet of the adsorbent was 0%.

In C, D, and E, the water vapor which was not able to be adsorbed because of an excess amount was discharged via the outlet. Light water was selectively adsorbed on the adsorbent, and thus the deuterium concentration in the water vapor discharged was from 155 to 165 ppm, and deuterium-enriched water was able to be obtained (deuterium-enriched water outlet).

In F, water vapor adsorbed on the adsorbent was desorbed by the dry flow gas, and thus the deuterium concentration in the water vapor discharged was 125 ppm, and deuterium-depleted water was able to be obtained (deuterium-depleted water outlet).

REFERENCE SIGNS LIST

1: measuring apparatus, 2: water, 3: test tube, 4: adsorbent, 5: adsorbent, 6: pore, 7: light water, 8: heavy water and semi-heavy water, 9: separator, 10: supply apparatus, 11: adsorption tank, 12: deuterium-enriched water outlet, 13: deuterium-depleted water outlet, 14: adsorbent, 15, 16: intermediate zone, 17, 18: mass flow controller, 19: water vapor generator, V1, V2, V3: valve, A, B, C, D, E, F, G: position.

The invention claimed is:

1. A method for producing deuterium-depleted water by removing heavy water and semi-heavy water from water, the method comprising:

adsorbing a large amount of light water on an adsorbent including a pore body including a carbon material or an oxide while supplying water vapor to and allowing the water vapor to pass through the adsorbent for a predetermined period of time, the carbon material having a pore having a length to a bottom longer than a pore diameter of an opening portion by 5 times or more and a ratio of an outer surface area of a portion that is not the pore to an inner surface area of the pore of greater than 1:10 or the oxide having a pore having a length to a bottom longer than a pore diameter of an opening portion by 5 times or more and a ratio of an outer surface area of a portion that is not the pore to an inner surface area of the pore of greater than 1:5; and then desorbing the water vapor adsorbed on the adsorbent and having low concentrations of heavy water and semi-heavy water from the adsorbent to recover deuterium-depleted water.

2. A method for producing deuterium-depleted water by removing heavy water and semi-heavy water from water, the method comprising:

rotating an adsorbent in a circumferential direction, the adsorbent including a pore body including a carbon material or an oxide, the carbon material having a pore having a length to a bottom longer than a pore diameter of an opening portion by 5 times or more and a ratio of an outer surface area of a portion that is not the pore to an inner surface area of the pore of greater than 1:10 or the oxide having a pore having a length to a bottom longer than a pore diameter of an opening portion by 5 times or more and a ratio of an outer surface area of a portion that is not the pore to an inner surface area of the pore of greater than 1:5, and disposing a supply port for water vapor and a supply port for a flow gas not containing water vapor side by side in the circumferential direction of rotation of the adsorbent;

supplying water vapor to and allowing the water vapor to pass through a part of the adsorbent; and, at the same time, supplying the flow gas to and allowing the flow gas to pass through another part of the adsorbent, and desorbing the water vapor adsorbed on the adsorbent from the adsorbent to recover deuterium-depleted water.

3. A method for producing deuterium-enriched water by removing light water from water, the method comprising:

adsorbing a large amount of light water on an adsorbent including a pore body including a carbon material or an oxide while supplying water vapor to and allowing the water vapor to pass through the adsorbent for a predetermined period of time, the carbon material having a pore having a length to a bottom longer than a pore diameter of an opening portion by 5 times or more and a ratio of an outer surface area of a portion that is not the pore to an inner surface area of the pore of greater than 1:10 or the oxide having a pore having a length to a bottom longer than a pore diameter of an opening portion by 5 times or more and a ratio of an outer surface area of a portion that is not the pore to an inner surface area of the pore of greater than 1:5, and recovering deuterium-enriched water from the water vapor not adsorbed on and passed through the adsorbent, the water vapor having high concentrations of heavy water and semi-heavy water.

4. A method for producing deuterium-enriched water by removing light water from water, the method comprising:

rotating an adsorbent in a circumferential direction, the adsorbent including a pore body including a carbon material or an oxide, the carbon material having a pore having a length to a bottom longer than a pore diameter of an opening portion by 5 times or more and a ratio of an outer surface area of a portion that is not the pore to an inner surface area of the pore of greater than 1:10 or the oxide having a pore having a length to a bottom longer than a pore diameter of an opening portion by 5 times or more and a ratio of an outer surface area of a portion that is not the pore to an inner surface area of the pore of greater than 1:5, and disposing a supply port for water vapor and a supply port for a flow gas not containing water vapor side by side in the circumferential direction of rotation of the adsorbent;

supplying the water vapor to and allowing the water vapor to pass through a part of the adsorbent to adsorb a large amount of light water on the adsorbent, and recovering deuterium-enriched water from the water vapor not adsorbed on and passed through the adsorbent, the water vapor having high concentrations of heavy water and semi-heavy water; and, at the same time, supplying the flow gas to and allowing the flow gas to pass through another part of the adsorbent, and desorbing the water vapor adsorbed on the adsorbent from the adsorbent.

\* \* \* \* \*